United States Patent [19]

Trabert et al.

[11] Patent Number: 4,581,408

[45] Date of Patent: Apr. 8, 1986

[54] HIGH IMPACT THERMOPLASTIC POLYAMIDE MOLDING COMPOSITIONS

[75] Inventors: Ludwig Trabert; Rüdolf Binsack, both of Krefeld; Christian Lindner, Cologne; Josef Merten, Korschenbroich; Friedrich Fahnler, Krefeld; Leo Morbitzer, Cologne, all of Fed. Rep. of Germany

[73] Assignee: Bayer Aktiengesellschaft, Leverkusen, Fed. Rep. of Germany

[21] Appl. No.: 625,138

[22] Filed: Jun. 27, 1984

[30] Foreign Application Priority Data

Jul. 9, 1983 [DE] Fed. Rep. of Germany ....... 3324907
Oct. 27, 1983 [DE] Fed. Rep. of Germany ....... 3339000

[51] Int. Cl.$^4$ ............................................. C08L 77/00
[52] U.S. Cl. ....................................................... 525/66
[58] Field of Search ......................................... 525/66

[56] References Cited

U.S. PATENT DOCUMENTS

| | | | |
|---|---|---|---|
| 4,098,734 | 7/1978 | Lee ........................................ | 525/64 |
| 4,221,879 | 9/1980 | Humme et al. ...................... | 525/66 |
| 4,250,271 | 2/1981 | Morris et al. ........................ | 525/66 |
| 4,297,446 | 10/1981 | Lindner et al. ..................... | 525/66 |
| 4,338,406 | 7/1982 | Sanderson et al. ................. | 525/66 |
| 4,381,371 | 4/1983 | Nielinger et al. ................... | 525/66 |
| 4,405,748 | 9/1983 | Nielinger et al. ................... | 524/504 |

FOREIGN PATENT DOCUMENTS

| | | |
|---|---|---|
| 0001245 | 4/1979 | European Pat. Off. . |
| 0014879 | 9/1980 | European Pat. Off. . |
| 0027198 | 4/1981 | European Pat. Off. . |
| 0043491 | 1/1982 | European Pat. Off. . |
| 0083446 | 7/1983 | European Pat. Off. . |

*Primary Examiner*—John C. Bleutge
*Assistant Examiner*—A. L. Carrillo
*Attorney, Agent, or Firm*—Connolly and Hutz

[57] ABSTRACT

This invention relates to thermoplastic molding compositions having improved impact strength at low temperatures comprising polyamides and grafted, at least partially crosslinked diene rubbers and/or acrylate rubbers having a bimodal rubber particle size distribution.

10 Claims, No Drawings

HIGH IMPACT THERMOPLASTIC POLYAMIDE MOLDING COMPOSITIONS

This invention relates to thermoplastic molding compositions having improved impact strength at low temperatures comprising polyamides and grafted, at least partially cross-linked diene rubbers and/or acrylate rubbers having a bimodal rubber particle sizes distribution.

Moldings of polyamides have been successful because of their mechanical strength, such as their rigidity, abrasion resistance, hardness, dynamic and thermal stability, and the ease with which they can be produced. Their main disadvantage is unsatisfactory toughness.

Numerous proposals have been made towards improviding the toughness of polyamide molding compositions by the addition of other polymers Thus, polyolefins (DE-OS Nos. 16 94 802, 20 38 317 and 30 22 295) and ethylene ionomers (EP-A Nos. 34 704, 69 200, and 72 480) have been proposed. Grafted acrylate rubbers and grafted diene rubbers which have a specific graft structure and which have been produced by specific processes have also been proposed (EP-A No. 3 126 and DE-OS Nos. 27 58 615, 31 01 771 and 31 20 803).

The proposed molding compositions generally show improved toughness. However, it has been found that molding compositions of this type are not always totally satisfactory for certain applications, for example in the automotive field, where strong deformation forces occur in the event of collisions, affecting for example bodywork, fenders and spoilers, steering wheel and steering column. Molding compositions intended for applications such as these have to meet particular requirements, even at low temperatures of the order of $-20°$ C. or even $-30°$ C.

Accordingly, the present invention provides thermoplastic molding compositions comprising:

A. from 65 to 97% by weight, preferably from 70 to 95% by weight and, more preferably from 75 to 90% by weight (based on components A+B) of polyamide and B. from 3 to 35% by weight, preferably from 5 to 30% by weight and, more preferably, from 10 to 25% by weight (based on components A+B) of graft product of at least one vinyl monomer selected from styrene, acrylonitrile and methyl methacrylate on particulate, at least partially crosslinked diene rubbers and/or alkyl acrylate rubbers having average rubber particle diameters of from 0.05 to 1 μm and the graft products having a rubber content of from 60 to 85% by weight, preferably from 65 to 80% by weight and, more preferably, from 70 to 75% by weight, characterised in that the graft product B is produced on the basis of a mixture of (a) from 20 to 80% by weight, preferably from 30 to 70% by weight and, more preferably, from 35 to 60% by weight (based on a+b) of a rubber latex having a particle diameter $d_{50}$ of from 0.05 to 0.19 μm and preferably from 0.08 to 0.15 μm and (b) from 80 to 20% by weight, preferably from 70 to 30% by weight and, more preferably, from 65 to 40% by weight (based on a+b) of a rubber latex having a particle diameter $d_{50}$ of from 0.2 to 1 μm, preferably from 0.25 to 0.8 μm and, more preferably from 0.3 to 0.6 μm with the limitation that (1) $d_{50}(b)$ is larger than $d_{50}(a)$ by a factor of from 1.5 to 8, preferably from 2.7 to 5, in particular from 3 to 4.5, (2) the quotient $Q=(d_{90}-d_{10})/d_{50}$ of the particular rubbers is at most 2, preferably at most 1.8, in particular at most 0.8, and (3) the difference $d_{10}(b)-d_{90}(a)$ is from 0.01 to $-0.10$, preferably from 0 to $-0.08$ and in particular from 0 to $-0.05$.

The percentage by weight above are referred to the solids content.

The graft product B may be produced either by mixing a rubber latex corresponding to (a) and a rubber latex corresponding to (b) in the required quantitative ratio and graft polymerizing the vinyl monomer onto the resulting mixture or by separately graft polymerizing the vinyl monomers onto a rubber latex corresponding to (a) and onto a rubber latex corresponding to (b) and then mixing the two graft products (either in the form of latices, followed by co-precipitation or in the form of the solids already present). The second method is preferred.

These molding compositions are more suitable for the above-mentioned applications than known molding compositions and, moreover, they do not have any significant disadvantages.

It is essential to use at least partially cross-linked diene rubbers and/or alkyl acrylate rubbers having rubber particle diameters $d_{50}$ of from 0.05 to 1 μm and a "bimodal" particle diameter distribution.

This means that by combining particular coarsely-divided rubbers with particular finely divided rubbers in the form of graft polymers B molding compositions according to the invention having considerably improved properties are obtained; for this purpose, the particle size distribution of the rubbers which are used for the preparation of component B has to be bimodal and should exhibit two pronounced maxima. In order to obtain the effect associated with these specific particle size distribution, it is, however, necessary to start with rubber having a particle size distribution conforming to specific parameters:

These include a critical width of the distribution curve (expressed by the quotient Q), a critical distance between the maxima of the distribution curve (expressed by the difference $d_{50}(b)-d_{50}(a)$) and a critical overlapping of the distribution curves (expressed by the difference $d_{10}(b)-d_{90}(a)$).

The molding compositions according to the invention are distinguished by the fact that, irrespective of their modifier content, they remain impact-resistant at temperatures down to $-20°$ C. and, in some cases, down to $-30°$ C. and by the fact that their toughness properties only begin to deteriorate at temperatures below those levels.

This effect according to the invention is all the more surprising insofar as finely particulate rubber only improves the impact strength of thermoplastic polyamides whilst coarsely divided rubbers result in a continuous deterioration in toughness with decreasing temperature.

The effect according to the invention was not foreseeable because known ABS-plastics, which contain both coarsely and finely divided graft rubbers together (cf. DE-AS No. 24 20 358), undergo a continuous deterioration in toughness with decreasing temperature, which is what had been expected to occur here also.

The graft products B include graft polymers having elastomeric properties of the type obtained by grafting vinyl monomers from the group consisting of styrene, acrylonitrile and methyl methacrylate onto particulate, at least partially crosslinked diene rubbers and/or alkyl acrylate rubbers.

Preferred graft monomers are methyl methacrylate and also mixtures of styrene and methyl methacrylate or styrene and acrylonitrile.

Diene rubbers are particulate, crosslinked homo- and/or copolymers of conjugated $C_4$–$C_6$-dienes. The preferred diene is 1,3-butadiene. In addition to the diene residues, the diene copolymers may contain up to 30% by weight, based on the copolymer, of residues of other ethylenically unsaturated monomers, for example styrene, acrylonitrile, esters of acrylic or methacrylic acid with monohydric alcohols containing from 1 to 4 C-atoms, for example methyl acrylate, ethyl acrylate, methyl methacrylate and ethyl methacrylate.

The production of the diene rubber graft base and of the graft polymers is known and is described, for example, in "Methoden der Organischen Chemie" (Houben-Weyl), Vol. 14/1, Georg Thieme Verlag, Stuttgart 1961, pages 393 to 406 and also in Ullmanns Encyclopädie der technischen Chemie, 4th Edition, Vol. 19, Verlag Chemie 1981, pages 279 to 284.

Alkyl acrylate rubbers are particulate, cross-linked alkyl acrylate polymers obtained by the polymerization of esters of acrylic acid and monohydric alcohols containing from 1 to 8 C-atoms. The polymers may also be copolymers of acrylic acid esters with up to 40% by weight of other vinyl monomers, such as styrene, acrylonitrile, methyl methacrylate, vinyl esters and vinyl ethers.

The alkyl acrylate rubbers are crosslinked, for example, by the copolymerization of polyfunctional, copolymerizable, ethylenically unsaturated comonomers, having a crosslinking effect. Monomers containing more than one polymerizable double bond may be copolymerized for crosslinking. Preferred examples of crosslinking monomers are esters of unsaturated monocarboxylic acids containing from 3 to 8 C-atoms and unsaturated monohydric alcohols containing from 3 to 12 C-atoms or saturated polyols containing from 2 to 4 OH-groups and from 2 to 20 C-atoms, for example ethylene glycol dimethacrylate, allyl methacrylate; polyunsaturated heterocyclic compounds, for example trivinyl and triallyl cyanurate and isocyanurate, tris-acryloyl-s-triazines; more particularly triallyl cyanurate; polyfunctional vinyl compounds, such as di- and trivinyl benzenes; and also triallyl phosphate and diallyl phthalate.

Preferred crosslinking monomers are allylmethacrylate, ethylene glycol dimethacrylate, diallyl phthalate and heterocyclic compounds containing at least three ethylenically unsaturated groups.

Particularly preferred crosslinking monomers are the cyclic monomers triallyl cyanurate, triallyl isocyanurate, trivinyl cyanurate, triacryloyl hexahydro-s-triazine and triallyl benzenes.

The crosslinking monomers are preferably used in quantities of from 0.02 to 5% by weight and, more preferably, in quantities of from 0.05 to 2% by weight, based on the rubber graft base.

In the case of cyclic crosslinking monomers containing at least three ethylenically unsaturated groups, it is advantageous to use no more than 1% by weight, based on the rubber graft base.

Alkyl acrylate rubbers may also be multiple-shell products which contain a crosslinked diene rubber of one or more conjugated dienes, such as polybutadiene, or a copolymer of a conjugated diene with an ethylenically unsaturated monomer, such as styrene and/or acrylonitrile, as the core and poly(meth)acrylate graft-polymerized as a shell onto that core.

The percentage of polydiene core in multiple-shell rubber graft bases of this type may amount to between 0.1 and 80% by weight and preferably to between 10 and 50% by weight. Shell(s) and core may be partially crosslinked or highly crosslinked independently of one another.

The diene rubbers and the alkyl acrylate rubbers are in the form of particles having an average diameter of $d_{50}$ of from 0.05 to 1 μm and are at least partially crosslinked. They have gel contents of $\geq 50\%$ by weight, preferably $\geq 80\%$ by weight and, more preferably $\geq 90\%$ by weight.

The advantageous particle diameter d may be determined by ultracentrifuge measurements (W. Scholtan, H. Lange, Kolloid Z. and Z. Polymere 250 (1972), 782–796) or by electron microscopy, followed by particle counting (G. Kaempf, H. Schuster, Angew. Makromolekulare Chemie 14, (1970) 111–129).

If the particle size distributions are determined by means of electron microcopy and subsequent counting of the particles, number averages (and not weight averages) are obtained. Number averages thus determined do then, however, have to be converted into weight averages to make them comparable with the values $d_{10}$, $d_{50}$, $d_{90}$ given herein. This conversion can be carried out, for instance, by the method of W. Scholtan and H. Lange and provides the same or nearly the same values for both methods. Furthermore, reference is made to DIN (German Industrial Standard) 53 206 in which conversions of particle size distributions are defined.

The average particle sizes given in this application are in all cases the weight averages of the particle size as determined by means of an analytical ultracentrifuge according to the method of W. Scholtan and H. Lange, Kolloid-Z. and Z. Polymere 250 (1972), pages 782–796. The ultracentrifuge determination provides the integral mass distribution of the particle diameter of the specimen. From this it is possible to conclude which percentage by weight of the particles have a diameter equal to or smaller than a particular size. The average particle diameter which is also termed the $d_{50}$ value of the integral mass distribution is defined as that particle diameter at which 50% by weight of the particles have a diameter equal to or smaller than the diameter eualling the $d_{50}$ value. In order to characterise the width of the size distribution of the rubber particles, the $d_{10}$ and $d_{90}$ values taken from the integral mass distribution are used in addition to the $d_{50}$ value (average particle diameter). The $d_{10}$ and $d_{90}$ values of the integral mass distribution are defined in the same same way as the $d_{50}$ value, but with the difference that they refer to 10 and 90%, by weight, of the particles. The quotient $$\frac{d_{90} - d_{10}}{d_{50}} = Q$$

is a criterion for the width of the distribution of the particle size:

The difference $d_{10}(b) - d_{90}(a)$ is a criterion for the overlapping of the curves: If the difference is positive, there is no or only a slight overlapping of the curves; if the difference is negativ, a curve overlapping exists, the extent of which is given by the size of the negative value.

As already stated, it is also possible to determine the number average distribution of the rubber particles and then to convert these into weight averages. The microscopic counting method according to Kämpf et al. is the more exact, the greater the number of particles counted; usually, at least $10^4$ particles should be measured which then, after statistical evaluation, provide a particle size number average distribution curve. It is, for instance, possible in this procedure to select the particle size classes to be of such a size that 90% of the particles are distributed over not less, but not more than 20 classes.

It must, however, be added that the rubber particles in the moulding compositions are in a grafted state; it could, therefore, be assumed that the grafting has changed the rubber particle size compared with the rubber particles present in the rubber latices (for the preparation of B). It has, however, been found that the grafting as well as the quantity of the graft shell, according to the characteristics described herein, hardly influence the rubber particle size so that distribution curves determined from molding compositions can be compared with distribution curves determined from latices.

The gel content of the diene rubbers is determined in toluene at 25° C. and the gel content of the alkyl acrylate rubber is determined in dimethyl formamide at 25° C. (M. Hoffmann, H. Kroemer, R. Kuhn, Polymeranalytik I and II, Georg Thieme Verlag Stuttgart, 1977).

Preferred grafted alkyl acrylate rubbers are those which a. are crosslinked with cyclic trifunctional comonomers, such as triallyl cyanurate and triallyl isocyanurate (as described in DE-OS No. 30 39 114), b. contain a polybutadiene core (as described in DE-OS No. 30 39 115), c. have been produced in the "absence of suspending agents" (as described in DE-OS No. 31 17 052).

The rubber content which is most favourable for the production of the molding compositions according to the present invention depends, among other things, on the rubber particle diameter in each case and on the graft density.

Rubbers having the particle diameters according to the invention may be obtained by the emulsion polymerization of suitable monomers. In the emulsion polymerization processes known for that purpose, the latex particle diameters may be adjusted in dependence upon the process conditions selected, for example in dependence upon the type and concentration of the emulsifier, particle agglomeration, electrolytes, temperatures and monomer/polymer concentration.

Where the graft products B are produced by graft copolymerization, which is normally carried out in the presence of radical initiators, for example water, soluble initiators, emulsifiers or complexing agents/ graft activators, and also regulators, free polymers or copolymers of the graft monomers forming the graft shell are also generally formed to a certain extent in addition to the actual graft copolymer. The quantity of this ungrafted polymer may be characterized by the degree of grafting or by the grafting yield which depends inter alia upon the polymerization conditions, upon the composition of the rubber graft base, upon the size of the particles to be grafted and upon the quantity of grafted rubber graft base.

Accordingly, graft product B in the context of the present invention is the product obtained by the polymerization of vinyl monomers in the presence of the rubber latices which, strictly speaking, is generally a mixture of graft copolymer and free (co)polymer of the graft monomers.

The molding compositions according to the invention show optimal properties when the quantity of free (co)polymer of the graft monomers does not exceed certain limits. This upper limit is generally set at 15% by weight, preferably at 10% by weight and, more preferably of A+B. In addition, the Staudinger Index $[\eta]$ of these free (co)polymers is usually $\leq 0.6$ dl/g and preferably $\leq 0.4$ dl/g, as measured in dimethyl formamide at 25° C.

To obtain certain technological properties, it may even be advantageous separately to produce the polymers of the graft monomers and then to incorporate them in the molding compositions by mixing during their production. However, the separately produced polymer of the graft monomers may also be present during the graft (co)polymerization process. It is also possible to separate any excess polymer of the graft monomers from the graft products B. The particular procedure adopted will depend upon the polymerization process selected, upon the particular type of rubber graft base, upon the type and quantity of graft monomers and upon the required technological properties of the molding compositions.

The preferred procedure is that in which the graft polymerization of the graft monomers onto the rubber particles is carried out and controlled in such a way that the graft product compositions required in accordance with the invention are formed and, at the same time, the graft monomer polymer contents optionally required are also obtained.

Special polymers such as these, consisting of graft polymers in admixture with suitable graft monomer polymers, may then be directly used for producing the molding compositions. In such cases, the graft branch polymers may of course be largely indentical in chemical terms with the graft monomer polymers. However, it is also possible in accordance with the present invention for the graft monomer polymers to differ chemically from the graft monomers used for grafting. For example, a polymethyl methacrylate may be used as the graft monomer polymer and, at the same time, a styrene-acrylonitrile-grafted rubber as graft product B. Combinations such as these may afford certain advantages in regard to practical application.

The "bimodal" graft products B may be produced by any one of various methods. Thus, they may be produced by grafting a dispersion of finely divided rubber particles (corresponding to a) with monomers, subsequently mixing this graft polymer emulsion with a separately prepared graft polymer dispersion of coarsely divided rubber particles and subsequently working up the resulting mixture.

The rubber particle dispersions (latices) may also be mixed and the graft monomers subsequently graft-polymerized onto the resulting mixture, particularly in aqueous emulsion, by means of radical-forming systems, followed by working up in known manner. However, it is also possible separately to produce finely diVided and coarsely divided graft products and to mix then with the thermoplastic polyamides for producing the molding compositions according to the invention.

In the processes comprising separate grafting and common working up of the graft product on the one hand and in the separate production of finely divided and coarsely divided graft product on the other hand, it is also possible to use graft products in which the finely divided and coarsely divided components differ structurally from one another. Accordingly, these processes are preferred.

Suitable polyamides A are any thermoplastic polyamides, preferably partially crystalline polyamides. Thus polyamide-6, polyamide-6,6 and copolymers of these two components may be used as partially crystalline polyamides for the molding compositions according to the invention. In addition, it is possible to use partially crystalline polyamides of which the acid component consists completely or partly of terephthalic acid and/or isophthalic acid and/or suberic acid and/or sebacic acid and/or azelaic acid and/or adipic acid and/or cyclohexane dicarboxylic acid; of which the diamine component consists completely or partially of m- and/or p-xylene diamine and/or hexamethylene diamine and/or 2,2,4-trimethyl hexamethylene diamine and/or 2,4,4-trimethyl hexamethylene diamine and/or isophorone diamine and of which the composition is known from the prior art.

Other suitable polyamides are those of the type produced completely or partly from $C_6$–$C_{12}$-lactams, optionally in conjunction with one or more of the starting components previously mentioned.

Particularly preferred partially crystalline polyamides are polyamide-6 and polyamide-6,6.

The polyamides should have a relative viscosity (as measured on 1% by weight solution in m-cresol at 25° C.) of preferably from 2.0 to 5.0 and, more preferably, from 2.5 to 4.5.

The molding compositions according to the present invention may contain standard additives, such as lubricants and mold release agents, nucleating agents, stabilizers, fillers and reinforcing materials, flameproofing agents and dyes.

The fillers or reinforced molding compositions may contain up to 60% by weight, based on the reinforced molding composition, of fillers and/or reinforcing materials. Preferred reinforcing materials are glass fibers. Preferred fillers, which may also have a reinforcing effect, are glass beads, mica, silicates, feldspar, quartz, talcum, titanium dioxide and wollastonite.

The flameproofed molding compositions contain flameproofing agents generally in a concentration of less than 30% by weight, based on the flameproofed molding compositions.

Any known flameproofing agents may be used, including, for example, cyclic chlorine compounds, melamine and its salts, such as melamine cyanurate or melamine sulfate, and red phosphorus.

The molding compositions may be produced in the usual mixing units, such as mixing rolls, kneaders, single-screw and multiple-screw extruders.

Although, in most cases, all the resin components are best mixed in a single step, it may also be advisable in some cases initially to omit one or even two components and to add them at a later stage.

Thus, the molding compositions according to the invention may be produced in the above-mentioned mixing units by melting and homogenizing the two components A and B together or by incorporating the graft product B into a melt of the polyamide A.

The temperature prevailing during the preparation of the mixtures is generally at least 10° C. and best at most 80° C. above the melting point of the polyamide. The molding compositions according to the invention are distinguished by improved toughness. An outstanding feature is the improvement in toughness at low temperatures.

Commensurate with their property spectrum, the molding compositions according to the invention may be used anywhere in the injection molding and extrusion field where moldings are exposed to severe impact stressing, for example in the automotive field for fenders, spoilers, buffer strips, body components, steering wheels and steering columns.

The invention is illustrated by the following Examples.

EXAMPLES

I. Polyamide-6 having a relative viscosity of 3.5 (as measured on a 1% by weight solution in m-cresol at 25° C.).

II. Polyamide-6,6 having a relative viscosity (measured in the same way as for I) of 3.0.

III. Grafted polybutadiene rubber

III.1. Production of polybutadiene latices

III.1.1 The following emulsion was polymerized with stirring in a reactor at 65° C. until the monomer conversion was substantially complete (approx. 22 hours):

| | |
|---|---|
| 100.0 | parts by weight of butadiene; |
| 1.8 | parts by weight of the sodium salt of disproportionated abietic acid; |
| 0.257 | part by weight of sodium hydroxide; |
| 0.3 | part by weight of n-dodecyl mercaptan; |
| 1.029 | parts by weight of Na—ethylene diamine tetra-acetate; |
| 0.023 | part by weight of potassium persulfate; and |
| 176.0 | parts by weight of water. |

A latex is obtained, containing butadiene polymer particles with an average diameter ($d_{50}$) of 0.1 μm in a concentration of approximately 35–36%, by weight. The polybutadiene particles have gel contents of 90–95% by weight (as measured in toluene at 23° C.).

III 1.2. The following emulsion was polymerized for about 110 hours at 60°–68° C. by the procedure according to III.1.1:

| | |
|---|---|
| 100.0 | parts by weight of butadiene; |
| 70.0 | parts by weight of water; |
| 1.146 | parts by weight of the sodium salt of disproportionated abietic acid; |
| 0.055 | part by weight of Na—ethylene diamine tetra-acetate; |
| 0.137 | part by weight of sodium hydroxide; |
| 0.028 | part by weight of sodium hydrogen carbonate; and |
| 0.282 | part by weight of potassium persulfate. |

A latex is obtained, containing polybutadiene particles with an average diameter ($d_{50}$) of 0.4 μm in a concentration of approximately 58% by weight. The polybutadiene particles have gel contents of 90 to 91% by weight (as measured in toluene at 23° C.).

III.2 Production of graft products (a) Parts by weight of polydiene latex and (b) parts by weight of water are initially introduced with stirring into a reactor at 65° C. After initiation with (c) parts by weight of potassium persulfate, 100 parts by weight of methyl methacrylate and, separately therefrom, a mixture of (d) parts by weight of water, (e) parts by weight of the sodium salt of disproportionated abietic acid and (f) parts by weight of 1N aqueous sodium hydroxide are metered thereto over a period of several hours. The mixture is then left to polymerize at 65°–75° C. to a final conversion of 98% by weight. The quantitative data of these graft polymerization reactions are shown in the following Table.

TABLE 1
Production of graft products

| Type | Latex III 1.1 (a) | Latex III 1.2 (a) | b | c | d | e | f |
|---|---|---|---|---|---|---|---|
| A | — | 690 | 100 | 0.50 | 100 | 4.0 | 3.0 |
| B | 228 | 551 | 100 | 0.52 | 100 | 4.2 | 3.1 |
| C | — | 517 | 150 | 0.58 | 100 | 4.8 | 3.5 |
| D | 171 | 414 | 100 | 0.52 | 100 | 4.8 | 3.5 |
| E | — | 402 | 233 | 0.67 | 100 | 5 | 3.66 |
| F | 666 | — | 134 | 0.66 | 100 | 6.25 | 4.37 |
| G | 133 | 322 | 190 | 0.66 | 100 | 5.1 | 3.8 |
| H | 200 | 281 | 170 | 0.66 | 100 | 5.3 | 3.9 |
| I | 266 | 241 | 135 | 0.66 | 100 | 5.4 | 3.0 |
| J | 333 | 201 | 100 | 0.66 | 100 | 5.5 | 4.0 |
| K | 400 | 161 | 80 | 0.66 | 100 | 5.6 | 4.1 |
| L | 533 | 81 | 29 | 0.66 | 100 | 5.6 | 4.5 |
| M | 333 | 201 | 80 | 0.50 | 100 | 4.0 | 3.5 |

For the above graft products and for the rubber bases thereof, the following relations exist (as far as rubber mixtures are concerned):

$$\frac{d_{50}(b)}{d_{50}(a)} = 4; \quad d_{10}(b) - d_{90}(a) = -0.07.$$

TABLE 2
Composition of the graft products

| Type | Polybutadiene III.1.1 % by weight[2] | Graft base III.1.2 % by weight[2] | Graft monomer methyl methacrylate % by weight[2] | Ungrafted MMA-resin[1] parts by weight in 100 parts by weight of graft polymer |
|---|---|---|---|---|
| A | — | 80 | 20 | 9 |
| B | 16 | 64 | 20 | 8 |
| C | — | 75 | 25 | 11 |
| D | 15 | 60 | 25 | 10 |
| E | — | 70 | 30 | 15 |
| F | 70 | — | 30 | 13 |
| G | 14 | 56 | 30 | 15 |
| H | 21 | 49 | 30 | 15 |
| I | 28 | 42 | 30 | 15 |
| J | 35 | 35 | 30 | 15 |
| K | 42 | 28 | 30 | 15 |
| L | 56 | 14 | 30 | 15 |
| M | 39 | 39 | 22 | ./[3] |

[1][η]DMF = 0.18–0.31 dl/g, as measured at 25° C.
[2]Total composition of the graft product disregarding the ungrafted resin present
[3]The graft product M does not contain any free MMA-resin (free MMA-resin in the graft product was removed by extraction with methylene chloride).

IV. Grafted polyacrylate rubber
IV.1 Finely divided acrylate rubber

The following components were initially introduced into a reactor:
1030 parts by weight of water and
5 parts by weight of sodium salt of $C_{14}$–$C_{16}$- alkyl sulfonic acids.

80 parts by weight of solution 1 (see below) are run in at 70° C. Polymerization is the initiated by the addition of 5 parts by weight of potassium peroxydisulfate in 100 parts by weight of water. The following solutions are then run in:

| Solution 1: | 995 parts by weight of n-butyl acrylate; and 5 parts by weight of triallyl cyanurate (80 parts by weight of this solution were introduced before and the rest after initiation). |
|---|---|
| Solution 2: | 20 parts by weight of the sodium salts of $C_{14}$–$C_{18}$–alkyl sulfonic acids and 700 parts by weight of water. |

After the addition of solutions 1) and 2) over a period of 5 hours at 70° C., polymerization is continued for 4 hours at 70° C. A latex having a solids content of 35% by weight is formed. The latex particle size is 0.09 μm (latex IV.1).

IV.2 Coarsely divided acrylate rubber
The following solutions are used:

| Starting solution 1: | 12.4 parts by weight of latex IV.1; and 313 parts by weight of water; |
|---|---|
| Starting solution 2: | 0.82 part by weight of potassium peroxy disulfate; and 20 parts by weight of water; |
| Addition 1: | 629 parts by weight of n-butyl acrylate; and 1 part by weight of triallyl cyanurate; |
| Addition 2: | 700 parts by weight of the sodium salts of $C_{14}$–$C_{16}$—alkyl sulfonic acids. |

Starting solution 1 is heated at 65°–68° C., after which 24 parts by weight of addition 1 are introduced. After initiation with starting solution 2, the rest of addition 1 and addition 2 are run in over a period of 5 hours, followed by stirring over a period of 4 hours. The latex has a solids content of 37% by weight. The latex particle size is 0.5 μm. The polymer has a gel content of 93% by weight and a swelling index (1) of 8, as measured in DMF at 23° C. (latex IV.2).

(1) For the definition of swelling index, see M. Hoffmann, H. Koemer, R. Kuhn, Polymeranalytik I and II, Georg Thieme Verlag, Stuttgart, 1977.

IV.3 Production of the graft products of acrylate rubber and methyl methacrylate
General procedure:
The following solutions or latices are polymerized in a reactor:

| Starting solution 1: | latex IV.1 or latex IV.2: A parts by weight; |
|---|---|
| Starting Solution 2: | potassium peroxydisulfate: 2 parts by weight; |
| Water: | 120 parts by weight; |
| Addition 1: | methyl methacrylate: 304 parts by weight; |
| Addition 2: | sodium salts of $C_{14}$–$C_{16}$—alkyl sulfonic acids: 6 parts by weight; |

-continued

| Water: | 396 parts by weight. |

Starting solution 1 is introduced into starting solution 2 at 65° C., followed by the introduction of addition 1 and addition 2 over a period of 4 hours at 65° C. The mixture is then left to polymerize to completion at 65° C. (4 h) (latex IV.3). The graft polymer latices are further treated as follows:

| | |
|---|---|
| Starting solution 3: | Water: 5525 parts by weight; MgSO$_4$ × H$_2$O (Epsom salt): 107 parts by weight; |
| Addition 3: | latex IV.3: B parts by weight; |
| Addition 4: | methyl methacrylate: 156 parts by weight; |
| Activator: | potassium peroxydisulfate: 1.3 parts by weight; Water: 78 parts by weight. |

Starting solution 3 is heated with thorough stirring to 70°–73° C. Addition 3 is then introduced over a period of 1 hour. Thereafter addition 4 is introduced over a period of 30 minutes, followed by activation with the activator solution. After heating to 80° C., the mixture is stirred for 2 hours, hours. After stabilization with 2 parts by weight of phenolic oxidation inhibitor, the reaction mixture is worked up by filtration, washing and drying to form a powder.

TABLE 3

| | Production of the graft products | | |
|---|---|---|---|
| | A parts by weight | | B parts by weight |
| Type | latex IV.2 | latex IV.1 | latex IV.3 |
| N | 3286.4 | ./. | 3795 |
| O | ./. | 3474.3 | 4011 |
| P | 1643 | 1737 | 3900 |

TABLE 4

| | Composition of the graft products | | |
|---|---|---|---|
| | Polyacrylate graft base parts by weight[1] | | Graft Shell methyl methacrylate |
| Type | latex IV.1 | latex IV.2 | parts by weight |
| N | ./. | 70 | 30 |
| O | 70 | ./. | 30 |
| P | 35 | 35 | 30 |

[1]based on solids content

The graft products N, O and P contain approximately 12% by weight of non-grafted MMA-resin with an intrinsic viscosity (Staudinger Index $[\eta]$ of 0.3 dl/g, as measured in DMF at 25° C.

B. Production and testing of the molding compositions

EXAMPLES 1–24

The components were melted and homogenized in a continuous-action twin-screw extruder. The barrel temperatures were selected such that the melt temperatures indicated in Tables 5 to 7 were maintained. The melt strand was degassed before issuing from the nozzle, cooled in water, granulated and dried.

Standard small test bars were produced from the molding compositions in an injection molding machine. Notched impact strength was tested at the temperatures indicated (in accordance with DIN 53 453).

EXAMPLES 25–27

As in Examples 1 to 24, the graft polymer was mixed with molten polyamide in the extruder. Chopped glass fibers 6 mm long were then introduced into and homogeneously distributed in the molten mixture.

After the melt had been degassed before issuing from the nozzle and the melt strand discharged into water, granulated and dried, standard small test bars were produced in the same way as described above. Impact strength and nothced impact strength were tested at various temperatures (in accordance with DIN 53 453). The results are shown in Table 8.

TABLE 5

| | Component | | | | Notched impact strength (kJ/m$^2$) | | | |
|---|---|---|---|---|---|---|---|---|
| | I Polyamide | | III Graft product | | | | | |
| Example | Type | % by weight | Type | % by weight | +20° C. | −20° C. | −30° C. | −40° C. |
| 1[1] | PA-6 | 80 | A | 20 | ub. | 20 | | 10 |
| 2 | PA-6 | 80 | B | 20 | ub. | ub. | | 12 |
| 3[1] | PA-6 | 79 | C | 21 | ub. | 22 | | 12 |
| 4 | PA-6 | 79 | D | 21 | ub. | ub. | | 13 |
| 5[1] | PA-6 | 78 | E | 22 | ub. | 23* | 15* | 12 |
| 6[1] | PA-6 | 78 | F | 22 | 50 | 14 | 10 | 8 |
| 7 | PA-6 | 78 | G | 22 | ub. | ub. | ub. | 14 |
| 8 | PA-6 | 78 | H | 22 | ub. | ub. | ub. | 16 |
| 9 | PA-6 | 78 | I | 22 | ub. | ub. | ub. | 17 |
| 10 | PA-6 | 78 | J | 22 | ub. | ub. | ub. | 20 |
| 11 | PA-6 | 78 | K | 22 | ub. | ub. | ub. | 16 |
| 12 | PA-6 | 78 | L | 22 | ub. | ub. | ub. | 12 |
| 13 | PA-6 | 85 | J | 15 | ub. | | | 10 |
| 14 | PA-6 | 90 | J | 10 | 35 | | | 7 |
| 15 | PA-6 | 78 | { E / F | 11 / 11 } | ub. | ub. | ub. | 19 |

*The test bars were only cracked in the test
[1]Comparative tests

The melt temperature in the extruder was 280° C. and, in the injection molding machine, 260° C.; the mold temperature was 80° C. The percentage by weight indicated are based on the molding composition.

TABLE 6

| | Component | | | | Notched impact strength (kJ/m$^2$) | | | |
|---|---|---|---|---|---|---|---|---|
| | II Polyamide | | III Graft product | | | | | |
| Example | Type | % by weight | Type | % by weight | +20° C. | −20° C. | −30° C. | −40° C. |
| 16[1] | PA-6,6 | 78 | E | 22 | ub. | 20 | 15 | 10 |
| 17[1] | PA-6,6 | 78 | F | 22 | 45* | 14 | 10 | 6 |
| 18 | PA-6,6 | 78 | J | 22 | ub. | ub. | ub. | 15 |
| 19 | PA-6,6 | 85 | J | 15 | ub. | | | 8 |
| 20 | PA-6,6 | 90 | J | 10 | ub. | | | 6 |
| 21 | AP-6,6 | 78 | E / F | 11 / 11 | ub. | | | 6 |

The melt temperature in the extruder was 280–290° C. and, in the injection molding machine, 270° C.; the mold temperature was 80° C. The percentages by weight indicated are based on the molding compositions.
*The test bars were only cracked in the test
[1]Comparative tests

TABLE 7

| | Component | | | | Notched impact strength (kJ/m$^2$) | |
|---|---|---|---|---|---|---|
| | I Polyamide | | IV Graft product | | | |
| Example | Type | % by weight | Type | % by weight | +20° C. | −20° C. |
| 22[1] | PA-6 | 78 | N | 22 | ub. | 10 |
| 23[1] | PA-6 | 78 | O | 22 | 20 | 4 |
| 24 | PA-6 | 78 | P | 22 | ub. | 15 |

The melt temperature in the extruder was 280° C. and, in the injection molding machine, 270° C.; the mold temperature was 80° C. The percentages by weight are based on the molding compositions.

TABLE 8

| | Component | | | | | Impact Strength kJ/m$^2$ | | Notched impact strength kJ/m$^2$ | |
|---|---|---|---|---|---|---|---|---|---|
| | I Polyamide | | IV Graft product | | Glass fiber | | | | |
| Example | Type | % by weight | Type | % by weight | % by weight | 20° C. | −20° C. | 20° C. | −20° C. |
| 25[1] | PA-6 | 60 | N | 10 | 30 | 55 | 50 | 18 | 15 |
| 26[1] | PA-6 | 60 | O | 10 | 30 | 45 | 40 | 14 | 12 |
| 27 | PA-6 | 60 | P | 10 | 30 | ub. | ub. | ub. | ub. |

The melt temperature in the extruder was 280° C. and, in the injection molding machine, 270° C.; the mold temperature was 80° C. The percentages by weight are based on the molding compositions.
[1]Comparative tests

We claim:
1. A thermoplastic molding composition comprising:
A. from 65 to 97% by weight (based on components A+B) of polyamide; and
B. from 3 to 35% by weight (based on components A+B) of graft product of at least one vinyl monomer selected from styrene, acrylonitrile and methyl methacrylate on a particulate, at least partially crosslinked diene rubber and/or alkyl acrylate rubber having an average rubber particle diameter of from 0.05 to 1 μm and the graft products having a rubber content of from 60 to 85% by weight, characterised in that the graft product B is produced on the basis of a mixture of
a. from 20 to 80% by weight (based on a+b) of a rubber latex having a particle diameter $d_{50}$ of from 0.05 to 0.19 μm; and
b. from 80 to 20% by weight (based on a+b) of a rubber latex having a particle diameter $d_{50}$ of from 0.2 to 1.0 μm
with the limitation that
(1) $d_{50}(b)$ is larger than $d_{50}(a)$ by a factor of from 1.5 to 8,
(2) the quotient $Q=(d_{90}-d_{10})/d_{50}$ of the particular rubbers is at most 2, and
(3) the difference $d_{10}(b)-d_{90}(a)$ is from 0.01 to −0.10.

2. A thermoplastic molding composition according to claim 1, characterised in that the graft product B is produced by mixing a rubber latex corresponding to (a) and a rubber latex corresponding to (b) and subsequently graft polymerising the vinyl monomers.

3. A thermoplastic molding composition as claimed in claim 1, wherein the graft product B is obtained by graft polymerization of the vinyl monomers onto a rubber latex corresponding to (a) and a separate graft polymerization of the vinyl monomers onto a rubber latex corresponding to (b), followed by mixing of the resulting graft products.

4. A thermoplastic molding composition as claimed in claim 1, wherein the diene rubber and/or the alkyl acrylate rubber has a gel content of 80% by weight.

5. A thermoplastic molding composition as claimed in claim 1, wherein the alkyl acrylate rubber is crosslinked with triallyl cyanurate and/or triallyl isocyanurate.

6. A thermoplastic molding composition as claimed in claim 1, wherein the alkyl acrylate rubber contains a polybutadiene core.

7. A thermoplastic molding composition as claimed in claim 1, wherein the graft product B is obtained by the co-grafting of finely and coarsely divided rubber particles.

8. A thermoplastic molding composition as claimed in claim 1, wherein the molding composition contains free (co)polymer resin of the graft monomers in a quantity of at most 15% by weight with a Staudinger Index [η] of =0.6 dl/g, as measured in dimethyl formamide at 25° C.

9. A thermoplastic molding composition as claimed in claim 1, wherein the molding composition contains up to 60% by weight of glass fibers.

10. A thermoplastic molding composition as claimed in claim 1, wherein the polyamide is polyamide-6, polyamide-6,6 or a corresponding copolyamide.

* * * * *